United States Patent [19]
Villalobos

[11] 3,762,878
[45] Oct. 2, 1973

[54] APPARATUS FOR ANALYZING AMBIENT AIR

[75] Inventor: Richard Villalobos, Fullerton, Calif.

[73] Assignee: Beckman Instruments, Inc., Fullerton, Calif.

[22] Filed: Apr. 19, 1971

[21] Appl. No.: 134,983

[52] U.S. Cl............ 23/232 E, 23/232 C, 23/254 E, 73/23.1
[51] Int. Cl....................... G01n 31/08, G01n 31/12
[58] Field of Search ..................... 23/232 E, 232 C, 23/254 E, 254 EF; 73/23.1

[56] References Cited
UNITED STATES PATENTS

| | | | |
|---|---|---|---|
| 943,627 | 12/1909 | Elworthy..................... | 242/472 X |
| 3,096,157 | 7/1963 | Brown et al.................. | 23/232 C |
| 3,168,378 | 2/1965 | Maresh et al. ............... | 23/232 C |
| 3,432,272 | 3/1969 | Emich......................... | 23/254 |
| 3,518,059 | 6/1970 | Levy........................... | 73/23.1 X |
| 3,558,283 | 1/1971 | Freeman et al.............. | 23/232 |

*Primary Examiner*—Morris O. Wolk
*Assistant Examiner*—R. M. Reese
*Attorney*—Fred L. Mehlhoff and Robert J. Steinmeyer

[57] ABSTRACT

An analytical apparatus and method for measuring pollutants in ambient air and specifically for measurement of methane, ethylene, acetylene, CO, $CO_2$ and total hydrocarbons in ambient air. The apparatus employs a hydrogen flame ionization detector and the gases employed in the analysis instrument are only those gases required for combustion in the flame detector. Air is employed as the carrier gas in a total hydrocarbon analysis line to the detector. The carrier air stream is passed through an oxidizer catalyst to completely oxidize the hydrocarbons in the carrier air to provide a true "zero-hydrocarbon" reference level in the ionization detector against which the total hydrocarbon content of the ambient sample is compared. Hydrogen is employed as the carrier gas in a gas chromatograph analyzer for separating the hydrocarbons and carbon monoxide in an air sample. The hydrogen carrier gas simultaneously provides the hydrogen requirements of a methanator in the chromatograph line, which converts carbon monoxide and carbon dioxide into methane so that a relative measurement may be made in the ionization detector for these constituents, as well as the hydrogen gas requirements of the detector.

13 Claims, 4 Drawing Figures

INVENTOR.
RICHARD VILLALOBOS

INVENTOR.
RICHARD VILLALOBOS
BY
ATTORNEY

APPARATUS FOR ANALYZING AMBIENT AIR

BACKGROUND OF THE INVENTION

1. Field of the Invention

The invention relates to analytical apparatus and a method for monitoring hydrocarbon and other pollutants in ambient air and more particularly to the measurement of total hydrocarbons in ambient air as well as the specific quantities of methane, ethylene, acetylene and carbon monoxide in ambient air. Carbon dioxide may also be measured by a slightly modified version of the apparatus.

2. Description of the Prior Art

Much effort has been expended in the recent past toward techniques of monitoring various pollutants in ambient air. The Public Health Service has established six monitoring stations in major urban areas across the country, equipped with instrumentation capable of providing continuous, simultaneous measurements on sulfur dioxide, oxides of nitrogen, total oxidant, total hydrocarbons and carbon monoxide in the air. Much of the instrumentation employed by the Public Health Service is of the wet chemical reagent type and these are still the most widely used monitors for these components. In monitoring "hydrocarbons," the hydrogen flame ionization detector has proved to be the most sensitive instrument for continuous monitoring of total hydrocarbons. Since it has been discovered that methane is also a natural component of the atmosphere, at a world-wide average level of 1 to 1.5 parts per million, and since methane normally represents from 50 percent to 80 percent of the total hydrocarbon reading in an ambient gas sample, it is necessary to ascertain the methane portion of the hydrocarbons in such a sample in order to arrive at a reasonable measurement of hydrocarbon pollutants in the ambient air.

A gas chromatograph approach to separation of hydrocarbons into methane and non-methane fractions is not new in the field. Furthermore, the separation of carbon monoxide using gas chromatograph techniques is old. Since the hydrogen flame ionization detector is not sensitive to carbon monoxide or carbon dioxide, it is necessary to first convert these constituents into methane or some other readable hydrocarbon in order to determine their relative composition in the air sample.

One of the problems associated with the use of a hydrogen flame ionization detector in measuring hydrocarbons is the determination of the magnitude of the detector background signal so that a true "zero-hydrocarbon" reference may be employed against which the sample constituents are compared. In the past, inert gases, such as helium, argon, and hydrogen, have been employed as the carrier stream in the measurement of the total hydrocarbon content of the sample and these carrier gases produce an inherent ionization in the hydrogen flame which is on the order of $1 \times 10^{-11}$ amps or more, which is approximately equivalent to the signal produced by 1 ppm methane in the gases entering the detector. The nature of the inert carrier gas itself and the hydrocarbon impurities in such carrier gas and in the hydrogen fuel account for much of the background signal.

SUMMARY OF THE INVENTION

It is an object of the present invention to provide a new and improved gas chromatograph and total hydrocarbon analyzer in which only those constituents required for combustion in a flame ionization detector are used as carrier gas streams in the hydrocarbon and gas chromatograph lines connecting with the detector.

It is another object of the invention to employ a hydrocarbon-free air as "zero" reference against which total hydrocarbons in a sample are measured in a flame ionization detector.

It is still another object of the invention to provide an improved method of analyzing an ambient air sample for total hydrocarbon content and for ascertaining the specific quantities of ethylene, ethane, acetylene, methane and carbon monoxide present in the ambient air.

In order to accomplish the foregoing objects, there is provided an improved apparatus for analyzing the pollutants in an air stream comprising a hydrogen flame ionization detector having a hydrogen gas and sample inlet connected with the outlet of a gas chromatograph analyzer line through which a source of hydrogen carrier gas and separated samples are received and to the outlet of a total hydrocarbon analyzer line through which a sample of ambient air and a stream of hydrocarbon-free air are received. The hydrocarbon line includes a catalytic combustion reactor for oxidizing all hydrocarbons in a carrier air stream prior to the injection of the ambient air sample into the line leading to the hydrogen flame detector and the gas chromatograph line includes a catalytic methanation reactor for converting carbon monoxide into a hydrocarbon capable of measurement in the ionization detector.

BRIEF DESCRIPTION OF THE DRAWINGS

For a better understanding of the invention, reference may be had to the accompanying drawings, in which.

DESCRIPTION OF THE PREFERRED EMBODIMENTS

Figure 1:
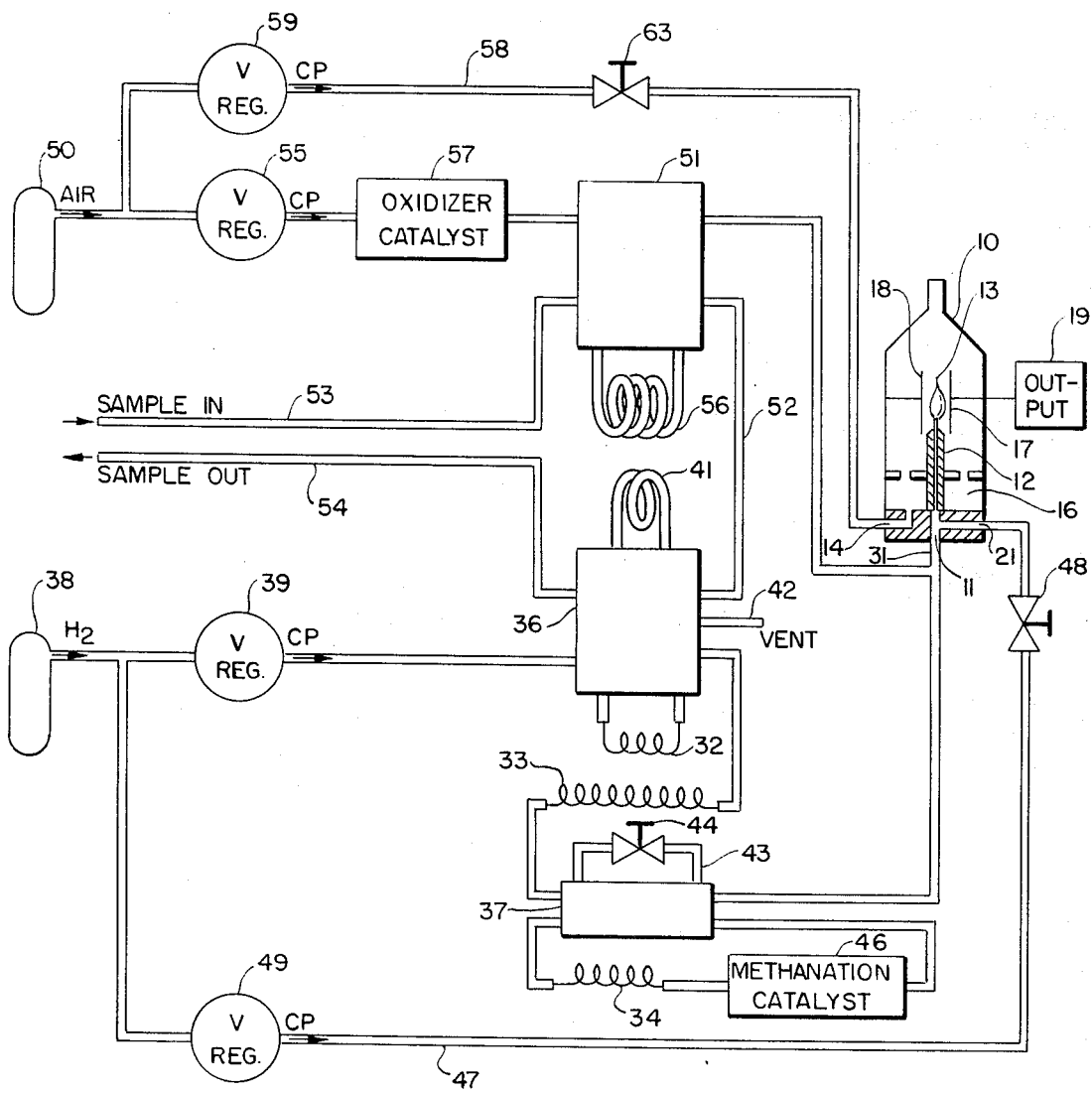
FIG. 1 is a schematic view of the associated components employed in the preferred embodiment of the apparatus.

Referring now to FIG. 1 there is shown in schematic form the preferred embodiment of the apparatus employing a hydrogen flame ionization detector 10 for providing a quantitative detection of hydrocarbon products. The hydrogen flame detector is provided with a hydrogen gas and sample inlet 11 connecting with a suitable burner 12 adapted to produce a hydrogen flame within the detector. Combustion air is provided through an air inlet opening 14 into a chamber 16 which disperses the air and provides uniform flow upwardly around the flame and hydrogen flowing through the burner 12. Suitable electrodes 17 and 18 measure an ionization current across the flame 13 and this measurement or signal is transmitted by suitable circuitry in the output 19 of the device. The output of the device is normally graphically represented by a chromatograph such as that shown in FIG. 2. In order to adjust or trim the hydrogen supplied to the burner 12, there is also provided a second hydrogen inlet through which an adjustable flow of hydrogen may be supplied for creating a proper hydrogen flame within the detector.

The apparatus includes a gas chromatograph analyzer line having an outlet 31 which is connected to the inlet 11 leading into the burner of the hydrogen flame detector. The gas chromatograph analyzer comprises a plurality of columns 32, 33 and 34 and an associated sampling valve 36 and switching valve 37. In the disclosed embodiments column 32 is a "stripper" column and column 33 is a primary column. Typically, both of these gas chromatograph columns are packed with porous polymers capable of separating the $C_2$ hydrocarbons and $CO_2$ from the rest of the sample and from each other. Column 34 is usually a molecular sieve column capable of separating methane, air and carbon monoxide. The gas chromatograph analyzer line is connected with a suitable source of hydrogen such as the hydrogen tank 38 which provides a carrier gas flow through the pressure regulator 39 to the various components of the chromatograph analyzer. The carrier stream thus flows through the chromatograph system and columns in series and ultimately enters the hydrogen flame detector through outlet 31.

In a preferred embodiment of the invention, the sample and switching valve 36 comprised a ten port valve which performs various functions. First, it injects samples into the carrier stream from a suitable sample air stream directed through ports in the valve and flowing through the sample loop 41. The sampling valve also functions to direct the air sample and carrier gas through a stripper column 32 designed to remove the heavy components from the sample. Thus, in the tripper column 32 all hydrocarbons, such as propane, butane and those heavier than ethane are retarded while the lighter compounds ethane, methane, ethylene, acetylene, carbon monoxide, carbon dioxide and air are quickly passed to other columns downstream. The valve 36 is then moved to a position so that the heavier components are back-flushed through the stripper column 32 and discharged from the apparatus through the exhaust vent 42 leading from the sample and switching valve 36.

The sample and switching valve 36 directs the flow of the lighter components through the second or main column 33 which effectively separates the $C_2$ hydrocarbons ethylene, ethane and acetylene and carbon dioxide. The inert gases, air, methane and CO elute quickly through column 33 into the switching valve 37, which, in a tested embodiment of the invention, is a six port valve having a bypass 43 and a suitable restrictor 44 for maintaining constant carrier gas flow through the system when the valve 37 is positioned so that column 34 and the remaining components thereafter are blocked from the system. The six port bypass valve 37 directs the inerts, air, methane and CO into the molecular sieve column 34 for separation therein. Air and the inerts are not retained in this column and very quickly pass through the detector.

At this time, the $C_2$ hydrocarbons are bypassed around the column 34 and directed into the detector for measurement. The $C_2$ hydrocarbons are directed around the molecular sieve column 34 because they would be almost irreversibly adsorbed by the molecular sieve. After the $C_2$ hydrocarbons and, as will be explained later on, the total hydrocarbons have eluted through the detector 10, the switching valve 37 is again positioned to direct the carrier stream through column 34 to separate methane and CO. As the latter components are eluted from the column 34 they are passed through a catalytic reactor 46 which is arranged in series with column 34. Catalytic reactor 46 is a methanation catalyst which converts the carbon monoxide eluting from the column 34 into methane so that it may be detected by the hydrogen flame ionization detector which is insensitive to the compound CO. In the tested embodiment, the methanation catalyst used for this purpose to analyze tested air samples consisted of a 6 inch length of ⅛ O.D. stainless steel tubing packed with a nickel-on firebrick catalyst and maintained at a temperature of at least 300° C. to assure complete methanation of all CO flowing therethrough.

While not absolutely essential to the invention, although desirable for proper adjustment of the hydrogen flame, there is provided a feeder conduit 47 connecting with the source 38 of hydrogen and having an outlet connecting to the hydrogen gas trimming inlet 21 to the hydrogen flame detector. A suitable flow of hydrogen for trimming the hydrogen flame may be obtained by adjusting the restrictor valve 48.

Also connected to the hydrogen and sample inlet 11 of the flame ionization detector 10 is an outlet of a hydrocarbon analysis line which has its inlet in turn connected to a suitable source 50 of air, which forms the carrier gas stream for analyzing total hydrocarbons in the ambient air. The hydrocarbon line includes a regulating valve 55 providing a constant pressure for the carrier air stream. Sampling valve 51 is positioned in this line and designed to insert a large air sample from the ambient air into the hydrocarbon line carrier stream. In the embodiment shown, ambient sample air is provided by an ambient air conduit 52 adapted to supply a stream of ambient air through both the sample valve 51 of the hydrocarbon analyzer and to the sample and switching valve 36 of the chromatograph analyzer. While not shown in the illustrated embodiment, this air may be supplied by means of a suitable pump through the sample conduit air inlet 53 and discharged through the sample outlet 54. The sample valve 51 inserts a large air slug, preferably on the order of 2 to 10 ml into the air stream flowing through the hydrocarbon analyzer line to the hydrogen flame detector 10.

At some point in the hydrocarbon line upstream from the sampling valve 51, there is provided an oxidizer catalyst 57, which is designed to convert all of the hydrocarbons in the air stream to $CO_2$ and water, thereby removing such hydrocarbons and providing a "hydrocarbon-free" carrier stream to the sample valve 51 into which the sample of ambient air is inserted. In a tested embodiment, the catalytic oxidizer consisted of a 6-inch length of ¼ inch O.D. stainless steel tubing packed with a catalyst consisting of nickel-oxide on firebrick. The catalytic oxidizer is maintained at a temperature sufficient to completely oxidize all of the hydrocarbons present in the carrier air stream. It was found necessary to maintain the catalytic reactor or oxidizer 57 at a temperature above 400° C. in order to completely burn off all of the hydrocarbon and provide hydrocarbon-free air for the carrier stream.

Also connected to the source of air supply 50 is a combustion air supply line 58 connecting with the combustion air inlet 14 of the hydrogen flame detector 10.

Pressure of the combustion air to the detector is suitably regulated by the pressure regulating valve 59.

Hydrogen carrier gas was chosen as the carrier gas for the chromatograph analyzer line of the apparatus simply because it is required for the methanation reaction in the catalytic methanator 46 and because it is also required as a fuel for the hydrogen flame detector. Choice of air as the carrier gas stream for the total hydrocarbon analysis, serves to eliminate the need for an additional inert gas supply. A second, equally important, benefit is that the problem of attaining a "zero-hydrocarbon" reference is considerably simplified. In the absence of hydrocarbons, the magnitude of the detector background signal is due primarily to the inherent ionization of the hydrogen flame, which is in the order of $1^1 \times 10^{-11}$ amps. The background signal is also influenced by other factors such as the ratio of carrier gas to hydrogen, and very greatly by the nature of the inert carrier gas itself and the amount of internal oxygen added. If a carrier gas other than air is employed, this creates serious problems that result from a radical change in flame characteristics that occur upon the introduction of the air sample into the detector. Even hydrocarbon-free helium carrier gas for example has a certain background ionization which is different from that of hydrocarbon-free air, and, as a consequence, the background signal with helium carrier in the absence of sample, is not of itself a reliable "zero-hydrocarbon" reference against which to measure the hydrocarbons in the air sample.

By using air as the carrier stream in the hydrocarbon analyzer line, this problem is simplified to one of comparing the hydrocarbon content of the sample to that of the carrier which has a very similar constituent make up. The only problem remaining is to provide "hydrocarbon-free" carrier air as a "zero" reference. Since, even a good quality compressed air usually contains 5–10 ppm hydrocarbons, some means of reducing this to as near zero as possible is essential. The catalytic oxidizer 57 overcomes this problem by completely oxidizing the hydrocarbons in the carrier air stream and provides a steady state "zero-background" signal against which to compare the hydrocarbons introduced into the air stream in the air sample.

Figure 2:
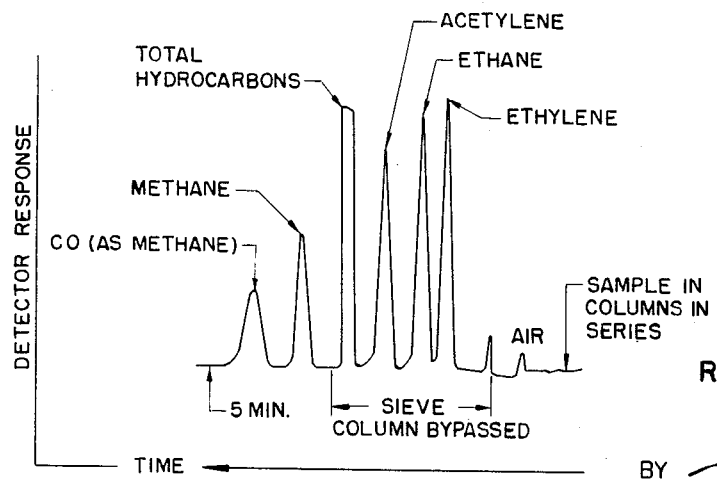
FIG. 2 is a typical chromatogram obtained utilizing the method and apparatus of the invention.

A typical chromatogram is shown in FIG. 2. This chromatogram was made with a synthetic blend containing 100 ppm (vol.) of each of the hydrocarbons and CO in air. As indicated by the chromatogram, the molecular sieve column 34 is bypassed after the inert gases have entered it, to allow the $C_2$ hydrocarbons, ethylene, ethane and acetylene, to elute from the main column 33 directly into the detector. That is, valve 37 closes the inlet to the molecular sieve column 34 and bypasses the $C_2$ hydrocarbons through the restrictor 44 and bypass line 43 directly into the hydrogen flame detector. Although not shown, the "stripper" column 32 is backflushed about one minute after the sample is injected and remains in that mode during the remainder of the cycle.

As indicated in FIG. 2, the total cycle time is 5 minutes. While the molecular sieve is bypassed, the total hydrocarbon sample is passed through the detector. However, this can be timed to occur at any time during the analysis cycle when it would not interfere with another measurement. As shown in FIG. 2, the total hydrocarbon measurement is characterized by a flat top appearance which results from the large sample inserted into the hydrocarbon line. The maximum width of the peak is determined by the length of time required for sample valve 51 to introduce the contents of sample loop 56 into the air line, but may be of shorter duration if sample valve 51 is returned to its former position before the entire contents of the loop is injected. The amplitude (or vertical displacement) of the flat top peak is indicative of the total hydrocarbon content of the air sample. Hence the amount of the sample in sample loop 56 which is required to be introduced into the air line is not critical, it being necessary only to introduce sufficient sample to allow the maximum height of the flat top peak to reach a steady state condition so that the amplitude may be recorded.

For the chromatogram illustrated in FIG. 2, a 10 ml sample of ambient air (sample test air) was inserted by the sample valve 51 into the hydrocarbon line. If small samples (less than 1 or 2 ml) are introduced into the hydrocarbon line at normal carrier flow rates and if the transfer time of the sample to and through the detector is so short (i.e. the distance between the sample valve 51 and detector 10 is short) then the small sample is introduced as a plug sample into the detector and this produces such extremely sharp gradients that the signal is essentially a square wave of such short duration that the conventional strip chart recorders cannot follow it. The sharp gradients will diffuse longitudinally to produce a gaussian shaped peak which most recorders can follow if the transport time of the sample to the detector is increased. This can be accomplished by either slowing the flow rate or increasing the distance which the sample must travel by separating the sample injector valve 51 from the detector 10 by a length of empty tubing. However, the shape or width of the gaussian peak depends upon the mutual diffusion coefficients of the hydrocarbon and carrier gas molecules. Since this is dependent upon molecular diameter and mass, the shape of the peak will be different for every species, and peak height measurement will be subject to errors from this source. By using a larger sample these problems are overcome, since the time it takes to introduce the sample into the line is somewhat greater and this provides a short term steady state signal which corresponds to the hydrocarbon content. The sharp leading and trailing gradients can thus be ignored and do not affect the accuracy of the measurement.

In the embodiment described in FIG. 1, the tank air which contains 5–10 ppm hydrocarbons is used as combustion air. Since the level of hydrocarbons is always constant (because it is taken from the same tank and this source is homogeneous) clean up is not required, i.e. the signal from the hydrocarbons is constant and can be nulled out.

Figure 3:
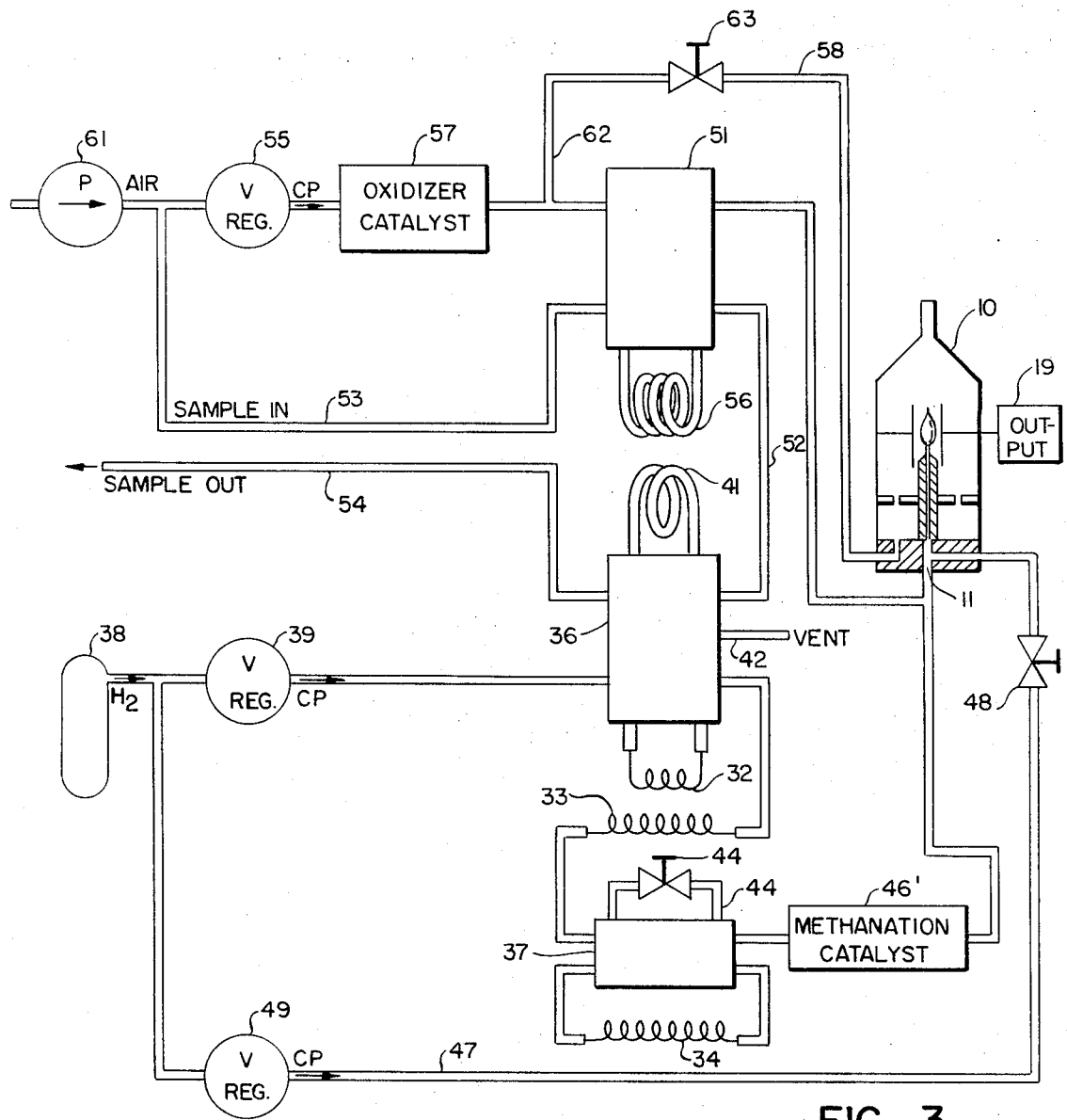
FIG. 3 is a modified version of the apparatus adapted to measure carbon dioxide as a constituent of an air sample.

FIG. 3 represents a modified version of the apparatus in which the source of carrier gas in the hydrogen line is ambient air supplied through a pump 61. Since the carrier air stream formed of ambient air has a multitude of hydrocarbons therein and of constantly variable concentration, which would affect the output and stability of the flame detector if used as combustion air in the detector, the combustion air line 58 is connected (by conduit 62) into the system at some point downstream from the catalytic oxidation reactor 57 so that a hydrocarbon-free air is provided as combustion air to the hydrogen flame ionization detector. The reactor 57 also provides hydrocarbon-free carrier air against which the hydrocarbons in the sample are compared as in the previously described embodiment. Obviously, the inlet 62 of the combustion air line 58 could be similarly arranged as in the first embodiment, described in FIG. 1, and a separate catalytic oxidation reactor 57 inserted into the line to provide a suitable hydrocarbon-free combustion air. Also in this embodiment, the pump 61 provides a motivating source for moving the ambient air through the sample conduit 52.

In this embodiment of the invention, the catalytic methanator 46' has been inserted into the gas chromatograph analyzer between the valve 37 and the inlet 11 to the ionization detector. Thus, all products separated in the main column 33 are now diverted or passed through the methanator 46' rather than merely those products passing through the molecular sieve column 34. In such an arrangement, carbon dioxide separated in the main column 33 is passed through the catalytic methanator 46' and converted to methane therein. In this arrangement, not only is carbon dioxide converted to methane in the methanator 46', but also both ethylene and acetylene (which are separated in column 33) are converted to ethane.

Figure 4:
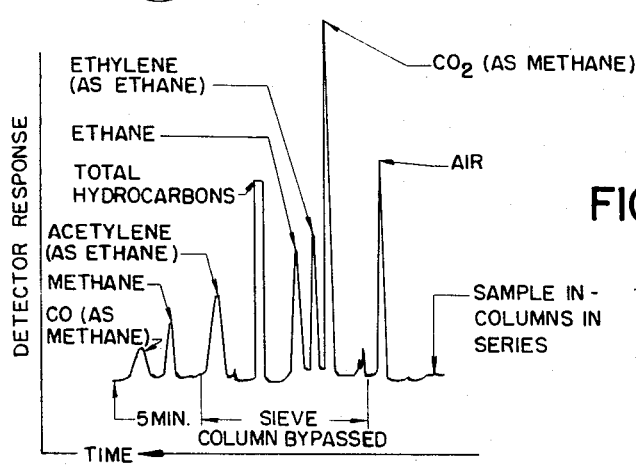
FIG. 4 is a typical chromatogram obtained utilizing the apparatus disclosed in FIG. 3.

FIG. 4 shows a chromatogram illustrating the output of the apparatus shown in FIG. 3. As will be noted in FIG. 4, when the molecular sieve column 34 is bypassed, the constituents eluting from column 33 are directed through the methanator 46' into the hydrogen flame detector. $CO_2$ is detected therein as methane and ethylene and acetylene are both detected as ethane. After acetylene has eluted from the column 33 and passed into the detector, the molecular sieve column 34 is switched back into the line so that methane and CO are eluted and passed through the catalytic methanator into the detector. As in the previously disclosed embodiment, CO is converted in the methanator into methane and is appropriately measured in the detector as methane.

While in accordance with the patent statutes, there has been shown and described what at present are considered to be the preferred embodiments of the invention, it will be obvious to those skilled in the art that various changes and modifications may be made therein without departing from the invention, and it is, therefore, the intent of the appended claims to cover all such changes and modifications as fall within the true spirit and scope of the invention.

What is claimed is:

1. Apparatus for analysis of pollutants in air comprising in combination:
   a hydrogen flame ionization detector having a hydrogen flame burner and including:
      a sample and hydrogen gas inlet connecting with said flame burner,
      a combustion air inlet, and
      electrode means for measuring ionization current across the flame of said burner;
   a total hydrocarbon analysis line including:
      a source of pressurized air,
         an inlet to said total hydrocarbon analysis line connected to said source of pressurized air to provide a carrier air stream flowing through said hydrocarbon line, said hydrocarbon analysis line having an outlet communicating with said sample and hydrogen gas inlet to said flame ionization detector,
      sample injection means for injecting an air sample into said carrier air stream flowing through said hydrocarbon line,
      an oxidizer catalyst in said hydrocarbon line upstream from said sample injection means for oxidizing all hydrocarbons in said carrier air stream thereby to supply a substantially hydrocarbon-free carrier air stream flowing through downstream portions of said line and into said burner of ionization detector for producing a steady-state background signal in said ionization detector;
   a combustion air supply conduit having an inlet end connecting with said source of pressurized air and an outlet end connected to said combustion air inlet of said ionization detector; and
   a chromatograph analyzer line including:
      a source of hydrogen gas,
         said chromatograph analyzer line having an inlet connected to said source of hydrogen gas to provide a carrier gas stream flowing through said analyzer line,
      sample injection means for injecting an air sample into said carrier gas stream in said analyzer line,
      a plurality of chromatograph columns and switching valves for said columns connected in said analyzer line for separating certain constituents of said air sample as it is carried by said carrier stream through said analyzer line,
      said analyzer line having an outlet connecting with said sample and hydrogen gas inlet to said ionization detector;
   whereby hydrogen gas for said flame ionization detector is supplied through said gas chromatograph analyzer line and said total hydrocarbons introduced into said carrier air stream flowing through said hydrocarbon analysis line are measured against the steady state background current created by said hydrocarbon-free carrier air stream flowing from said hydrocarbon line into said flame ionization detector.

2. The apparatus defined in claim 1 in which said sample injection means for injecting said air sample into said hydrocarbon line has sufficient sample volume to introduce a sufficiently large sample to provide a short term steady state signal which is indicative of the hydrocarbon content of the air sample and appears on a chromatogram as a flat topped peak.

3. The apparatus defined in claim 1 in which said oxidizer catalyst in said hydrocarbon line contains a nickel oxide catalyst which is maintained at a temperature sufficiently high to produce complete oxidation of all hydrocarbons in said carrier air stream flowing toward said sample air injection means and said detector.

4. The apparatus defined in claim 1 in which an additional hydrogen feed line is connected from said source of hydrogen to said inlet of said flame burner of said hydrogen flame ionization detector so that the quantity of hydrogen gas supplied to said flame burner may be adjusted to best support desired flame combustion.

5. Apparatus for analysis of pollutants in ambient air comprising in combination:
   a hydrogen flame-ionization detector having a hydrogen flame burner and including:
      a sample and hydrogen gas inlet connecting with said flame burner,
      a combustion air inlet, electrode means for measuring ionization current across the flame of said burner;

a total hydrocarbon analysis line including:

a source of pressurized air, an inlet to said total hydrocarbon analyzer line connected to said source of pressurized air to provide a carrier air stream flowing through said hydrocarbon line, said hydrocarbon analysis line having an outlet connecting with said sample and hydrogen gas inlet to said flame ionization detector, sample injection means for injecting an ambient air sample into said carrier air stream flowing through said hydrocarbon line, an oxidizer catalyst in said hydrocarbon line upstream from said sample injection means for oxidizing all hydrocarbons in said carrier air stream thereby to supply hydrocarbon-free carrier air through said hydrocarbon line and thereby producing a steady-state background signal in said ionization detector;

a combustion air supply conduit connecting at one end with said source of pressurized air and its other end with said combustion air inlet to said flame ionization detector;

a chromatographic analyzer line including:

a source of hydrogen carrier gas, said chromatograph analyzer line having an inlet connected to said source of hydrogen gas to provide a carrier gas stream flowing through said line, said analyzer line having an outlet communicating with said sample and hydrogen gas inlet to said ionization detector, sample injection means for injecting an ambient air sample into said carrier gas stream in said analyzer line, a gas chromatograph stripper column and valve means for inserting said column into said analyzer line for removing all sample constituents heavier than ethane from said carrier stream flowing therethrough, a second gas chromatograph column connected in series with said stripper column switching valve for separating ethylene, ethane, acetylene and $CO_2$ flowing therethrough, a second switching valve connected in said analyzer line after said second chromatograph column and a third chromatograph column adapted to be switched into and out of said analyzer line by said second switching valve, said third column being capable of separating methane, carbon monoxide and air flowing therethrough, a catalytic methanator connected between said third column and said detector for converting carbon monoxide flowing through said third column into methane for detection in said ionization detector;

whereby hydrogen gas for combustion in said flame ionization detector is supplied through said chromatograph analyzer line and said total hydrocarbons introduced into said carrier air stream flowing through said hydrocarbon line are measured against the steady-state background current created by said hydrocarbon-free carrier air stream flowing into said flame ionization detector from said hydrocarbon analysis line.

6. The apparatus defined in claim 5 in which said methanation catalyst comprises a nickel-on-fire brick catalyst maintained at a sufficiently high temperature to convert all carbon monoxide in said sample flowing through said methanation catalyst into methane.

7. The apparatus defined in claim 5 in which said stripper column and said second gas chromatograph column are packed with porous polymer materials and the third column is a molecular sieve column.

8. The apparatus defined in claim 5 in which said outlet of said chromatograph analyzer line connects directly with said second switching valve and effluent from said second column may be bypassed by said second switching valve around said third column and said methanation catalyst directly into said ionization detector.

9. The apparatus defined in claim 5 in which said source of pressurized air is an air pump having an inlet connecting with the ambient air and means are provided for supplying substantially hydrocarbon-free air through said combustion air supply conduit to said combustion air inlet to said ionization detector.

10. The apparatus defined in claim 9 in which said means for supplying hydrocarbon-free air through said combustion air supply conduit comprises an oxidizer catalyst connected upstream from said inlet to said combustion air supply conduit.

11. A method of measuring total hydrocarbons in an ambient air sample comprising the steps of:

providing a flame ionization detector having a hydrogen burner connecting with a sample gas and hydrogen gas inlet and a combustion air inlet for flowing combustion air around said burner;

providing a hydrogen gas stream to said sample and hydrogen gas inlet;

inserting into said sample and hydrogen gas inlet a carrier air stream so that said carrier air stream flows through said burner with said hydrogen gas;

at a point upstream from said sample and hydrogen gas inlet, oxidizing all hydrocarbons in said carrier air stream thereby to supply hydrocarbon-free air to said burner of said hydrogen flame ionization detector thereby producing a steady state background signal in said ionization detector;

inserting an ambient air sample into said hydrocarbon-free carrier air stream flowing into said sample and hydrogen gas inlet to said hydrogen flame ionization detector; and measuring the ionization current of said ambient air sample as it flows through said hydrogen flame ionization detector against the steady-state background signal produced by said hydrocarbon-free carrier air stream flowing through said detector.

12. The method defined in claim 11 in which said hydrocarbons in said air stream are oxidized by passing said air stream through a nickel-oxide catalyst maintained at a sufficiently high temperature to assure complete oxidation of all hydrocarbons in the air stream.

13. The method defined in claim 11 including the steps of supplying a source of hydrogen to the sample and hydrogen gas inlet of said flame ionization detector through a chromatograph analyzer line which may be employed to separate hydrocarbon compounds and other pollutants in air samples injected into the chromatograph analyzer line.

* * * * *